No. 747,032. PATENTED DEC. 15, 1903.
G. C. BARTOW.
OIL GAGE.
APPLICATION FILED AUG. 27, 1903.
NO MODEL.
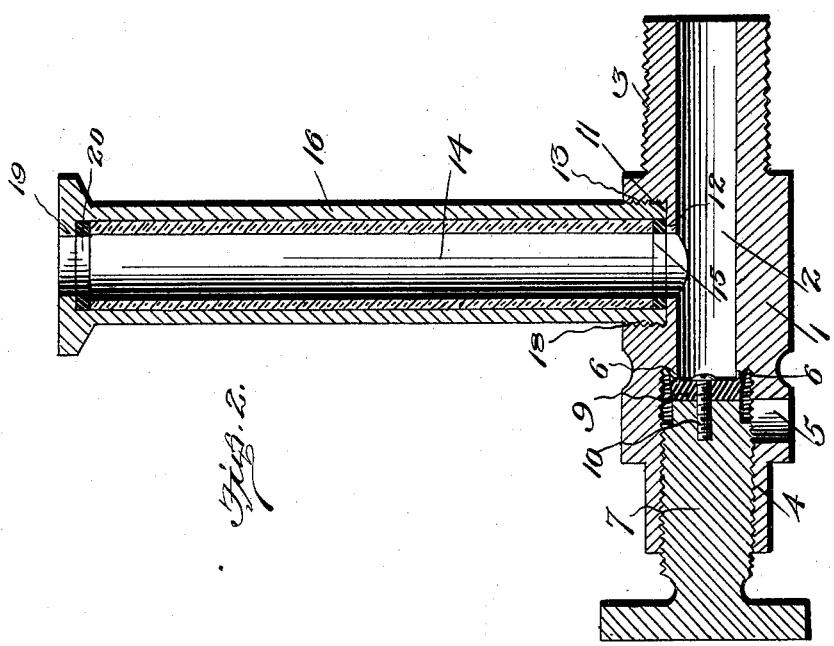
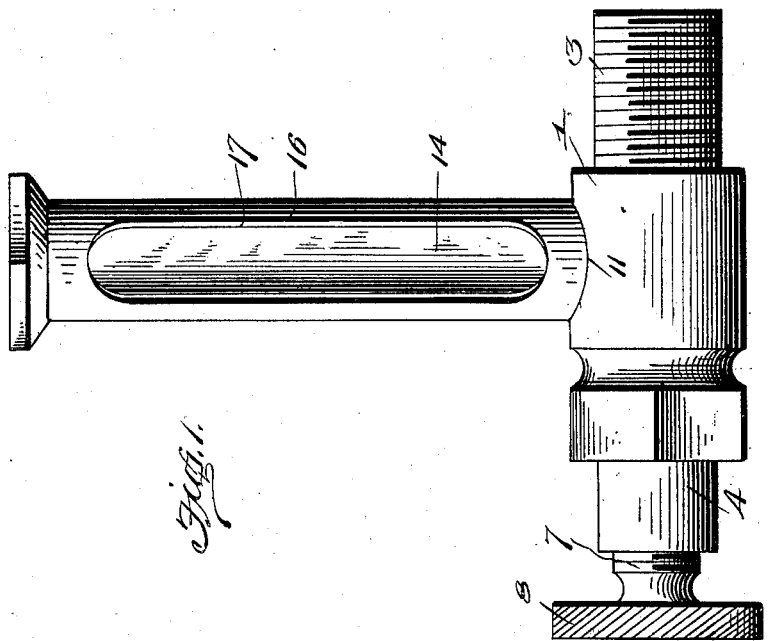
Witnesses
Inventor
G. C. Bartow
By
Attorney No. 747,032. Patented December 15, 1903.

UNITED STATES PATENT OFFICE.

GEORGE C. BARTOW, OF EAST ORANGE, NEW JERSEY.

OIL-GAGE.

SPECIFICATION forming part of Letters Patent No. 747,032, dated December 15, 1903.

Application filed August 27, 1903. Serial No. 170,950. (No model.)

*To all whom it may concern:*

Be it known that I, GEORGE C. BARTOW, a citizen of the United States, residing at East Orange, in the county of Essex and State of New Jersey, have invented certain new and useful Improvements in Oil-Gages; and I do declare the following to be a full, clear, and exact description of the invention, such as will enable others skilled in the art to which it appertains to make and use the same.

This invention relates to certain new and useful improvements in oil-gages for use upon oil reservoirs or bearings to enable the quality of oil or other liquid contained therein to be quickly and conveniently ascertained. Its object is to provide a simple, cheap, and efficient gage of this character in which the sight-tube is securely held in position and protected from injury and provision made for the free drainage of the oil from the tube when occasion requires.

In the accompanying drawings, Figure 1 is a view in side elevation of an oil-gage embodying my invention, and Fig. 2 is a vertical longitudinal section of the same.

In the embodiment of my invention as herein disclosed the numeral 1 represents a coupling member provided with a longitudinal bore or passage 2, an externally-threaded end 3 for attachment to the tank or reservoir containing the oil or other liquid, and an internally-threaded end 4, formed with a drain-passage 5, communicating with the adjacent portion of the bore 2. The bore 2 is enlarged in the end portion 4, and at the inner end of the enlarged portion the material of which the coupling is composed is raised or projected outward to form a valve-seat 6. A threaded stem or plug 7 fits in the threaded end 4 and has at its outer end a milled operating-knob 8 and at its inner end a gasket or washer 9, secured thereto by a screw or other suitable fastening 10. The said gasket or washer 9 is composed of some suitable soft metal or fiber which will accurately conform to the shape of the seat 6 and when the plug 7 is closed will prevent the flow of oil through the seat and drain-opening 5. Thus it will be seen that the plug forms a simple and effective valve for drainage purposes, as hereinafter described.

In the top of the coupling 1 is a countersink or socket 11, which communicates at its lower end with the bore 2. This socket 11 has a base-shoulder 12 and an annular threaded wall 13. A glass gage-tube 14 has its lower end entering said socket and resting against a gasket or washer 15, engaging the said shoulder 12. This tube serves as a gage-tube into which oil flows from the bore 2 to indicate the level of the oil in the tank or bearing. Surrounding the glass tube 14 is a metal tube 16, which protects the same from breakage and which is provided with a sight-opening 17. The lower end of this metal tube is threaded, as shown at 18, to engage the threaded wall of the socket 11 and is provided at its upper end with a shoulder or bearing portion 19, between which and the upper end of the glass tube 14 is a washer 20. When the metal tube is screwed down in the socket, the flange or shoulder 19 crowds the washer 20 against the upper end of the glass tube 14 and forces said tube downward into the socket, so that its lower end will fit tightly against the washer 15. By this means the tube 14 is clamped firmly in position and close joints are formed at the ends of the same to prevent the leakage of oil between the two tubes. The said shoulder 19 on the tube 16 may be formed by an integral flange or by an adjustable screw-cap, the latter when employed giving a separate adjustment whereby the gasket 20 may be independently compressed or released without affecting the gasket 15.

When the device is attached, it will be of course understood that as the outer end of the passage 2 is closed by the valve 7 the oil will flow upward into the tube 14 and indicate the level in the reservoir or bearing and that when it is desired to remove the tubes for any purpose the oil may be drained therefrom by simply opening the valve 17 to allow the oil to discharge through the drain-opening 5.

From the foregoing description, taken in connection with the accompanying drawings, the construction, operation, and advantages of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. An oil-gage comprising a coupling member provided with a longitudinal passage and having one end provided with screw-threads for connection with an oil-container and the other end formed with an internally-threaded bore communicating with said passage and provided with a valve-seat and a drain-opening, the said coupling member further being provided with a socket communicating with the passage intermediate said threaded ends, a screw-plug operating in the said internally-threaded bore and carrying a valve to engage said seat and control communication between the passage and drain-opening, a gage-tube seated in said socket, and a protecting-tube inclosing the gage-tube and having an adjustable connection with the socket, whereby the adjustment of said protecting-tube will secure both tubes to the coupling member, substantially as described.

2. An oil-gage comprising a coupling having an oil-passage and a screw-threaded socket communicating therewith, a gage-tube having one end seated in said socket, a gasket between the tube and coupling, a metallic protecting-tube inclosing the said gage-tube and having a screw-threaded end engaging said screw-threaded socket, a second gasket between the upper ends of the tubes, and a clamping member on the protecting-tube engaging the said second washer and adjustable to clamp the engaging tube and gasket through the protecting-tube by the screw-threaded engagement of the same with the socket, substantially as described.

In testimony whereof I have hereunto set my hand in presence of two subscribing witnesses.

GEORGE C. BARTOW.

Witnesses:
WILLIAM COGIN,
GEORGE REGAN.